United States Patent [19]

Fraser

[11] Patent Number: 4,915,577
[45] Date of Patent: Apr. 10, 1990

[54] SELF-PROPELLED MOBILE CRADLE FOR BOATS

[76] Inventor: Richard Fraser, 19 Donovan Dr., West Newbury, Mass. 01985

[21] Appl. No.: 172,061

[22] Filed: Mar. 23, 1988

[51] Int. Cl.$^4$ .............................................. B60P 3/10
[52] U.S. Cl. .................................... 414/476; 180/209; 280/612; 280/43.23; 414/484; 414/495
[58] Field of Search ............... 414/458, 459, 460, 474, 414/476, 481, 482, 484, 485, 495; 280/6 H, 43.23, 43.12, 6.12; 180/209

[56] References Cited

U.S. PATENT DOCUMENTS

| | | | |
|---|---|---|---|
| 2,749,137 | 6/1956 | Thomsen et al. | 180/209 |
| 2,931,450 | 4/1960 | Bear | 180/209 |
| 2,968,902 | 1/1961 | Brown | 180/209 |
| 3,191,954 | 6/1965 | Schuetz | 280/6 H |
| 3,240,506 | 3/1966 | McMullen | 414/495 |
| 3,369,682 | 2/1968 | Breault | 414/459 |
| 3,539,065 | 11/1970 | Brownell | 414/495 |
| 3,663,040 | 5/1972 | Weaver et al. | 414/458 |
| 3,712,404 | 1/1973 | Walquist | 280/6 H |
| 3,817,401 | 6/1974 | Becker | 414/12 |
| 4,229,019 | 10/1980 | Kohley | 414/495 |
| 4,232,879 | 11/1980 | Boxrud | 414/458 |
| 4,534,438 | 8/1985 | Mowat et al. | 180/209 |
| 4,619,578 | 10/1986 | Routledge | 280/6 H |

FOREIGN PATENT DOCUMENTS

| | | | |
|---|---|---|---|
| 2043880 | 2/1971 | France | 414/458 |
| 1534503 | 12/1978 | United Kingdom | 414/458 |

*Primary Examiner*—Andres Kashnikow
*Assistant Examiner*—Michael J. Forman
*Attorney, Agent, or Firm*—Owen J. Meegan

[57] ABSTRACT

A self-propelled mobile cradle for boats including a frame having transversely spaced, longitudinally extending side members interconnected at their forward ends to form an opening extending inwardly from the rear end of the frame. Forward driven wheels are used in a caster-like arrangement for supporting the forward end of the frame. Rear wheel are disposed at the rear of the frame for support. The rear wheels comprises at least two wheels each independently operable from the other, one of the wheels being disposed on each side of the frame. Hydraulically operated cylinders are used for raising or lowering the frame relative to the rear wheels. The rear wheels are disposed on independently operable suspension for each of the rear wheels, whereby one side of the frame can be raised or lowered relative to the other side of the frame. A forward driving mechanism is used for raising or lowering the foward end of the frame relative to the wheels. The wheels are turnable by a steering device which turns the forward wheels about an axis generally normal to the longitudinally extending side members, whereby the cradle can be turned by turning the forward wheels. The forward wheels are driven by the same power supply that powers the forward and rear lifting devices. Pads and extendable arms are attached to and disposed on each side of the longitudinally extending side members to engage the bottom of a boat and hold it stationary relative to the cradle.

16 Claims, 5 Drawing Sheets

SELF-PROPELLED MOBILE CRADLE FOR BOATS

FIELD OF THE INVENTION

The present invention relates to cradles for boats, and especially self-propelled mobile cradles for boats which can be used to move boats around in a boat yard for storage. The invention especially relates to a cradle that has a three point disposition on the ground and can move boats over a bumpy terrain.

SUMMARY OF THE PRIOR ART

In the past, boats have usually been stored on wooden cradles and they have been moved in a boat yard with tractors, bulldozers or yard donkeys. The movement of boats in many yards through the use of rollers and wooden cradles has not appreciably changed in centuries.

Early developments in the use of mobile cradles have included straddle trucks with slings that are disposed on trucks. The straddle truck approaches the boat and straddles it. Slings disposed on the straddle truck are placed beneath the boat to be moved and the boat is then lifted from the water or the from the location in which it was stored. When the boat has been moved to a land location, it is disposed on conventional supports and the straps are removed. Such a device is shown in the Kumferman U.S. Pat. No. 3,181,717. Similarly, in the Stern U.S. Pat. No. 3,409,153, a sling and hoist arrangement is shown for a tall masted boat in which the boat sling is connected to a frame for supporting the boat. A plurality of wheels movably supporting the frame can be used to move the boat around the yard.

Later approaches to the movement of boats is disclosed in the Brownell U.S. Pat. No. 3,539,065. In the Brownell patent, a generally U-shaped frame is disclosed in which four sets of wheels are used to support a boat. The front set of wheels is pivotably mounted on the front of the equipment and the boat is trailed behind a vehicle. During transporting, the boat is disposed on hydraulically operated pads which engage the bottom of the boat and hold it in place.

The Oehler U.S. Pat. No. 3,792,789, discloses the use of a U-shaped trailer which has wheels that are hydraulically movable to raise or lower the rear end of the trailer. The wheels are eccentrically disposed so that upon rotation, the rear end of the trailer will be raised or lowered.

In the Weaver U.S. Pat. a small boat carrier is disclosed which loan be used in a boat yard. The carrier is designed to be trailed behind a tractor, and a pair of closely disposed wheels are pivotably mounted at the front of the trailer. The rear wheels are movable upwardly or downwardly through the use of a piston. Broxrud U.S. Pat. No. 4,232,879, also discloses a generally U-shaped frame upon which a boat is mounted for transport. The wheels for the trailer are fixedly disposed upon axles, and the side frame is movable upwardly or downwardly relative to the axles. The Chase U.S. Pat. No. 4,538,952, discloses a trailer which has straps that support and lift a boat for movement. The Sanger U.S. Pat. No. 3,834,667, discloses a self-propelled device for moving boats which includes a generally U-shaped member upon which the boats are to be placed and a central wheel for steering the device.

Becker U.S. Pat. No. 3,817,401, Miller, U.S. Pat. No. 3,524556 and Thibodeau, U.S. Pat. No. 3,707.238, each disclose mechanisms for moving large objects other than boats, such as houses. Each of these references disclose the use of a wheeled device which can be shuttled to change the location of the object being moved.

SUMMARY OF THE INVENTION

The present invention relates to a self-propelled mobile cradle for boats. The cradle includes a frame that has transversely spaced longitudinally extending side members which are interconnected at their forward ends to form an opening that extends inwardly from the rear end of the frame. A pair of forward wheels which support the front end of the frame are driven and provide the propulsion for the cradle. Rear wheels are disposed at the rear of the frame and support it. The rear wheels are independently operable by a control device so that one side or the other of the frame can be raised or lowered (of course, both can be raised or lowered too). The cradle is steered through the forward wheel and the forward end of the frame can be raised or lowered also. Similarly, each side of the rear end of the frame can be raised or lowered by an articulated mechanism which draws the wheels together or spreads them apart.

The cradle of the present invention is disposed upon the ground at three points. The rear wheels form two of the points and the front wheels form the third point. The cradle is driven from the front end with the operator usually looking toward the back end. With a three point disposition of the cradle upon the ground, a plane is always formed. When one of the wheels encounters a bump or a hole, while the mobile cradle is being driven, the operator can raise or lower the frame so that the boat is continually generally in the same plane. As one of the wheels starts to enter a hole, for example, the operator can raise the frame relative to the wheels, thereby keeping the boat in place and preventing it from tipping over. Moreover, the use of the raising or lowering of the frame relative to the wheels enables the operator to place boats closely together in the boat yard.

In a preferred embodiment of the invention, the front wheels are arranged in a caster-like configuration which constitute the driving mechanism for the cradle. The caster includes a generally U-shaped yoke and a trunion that is pivotably attached to each end of the U of the yoke. A forward wheel is rotatably disposed on each of the trunions and they are revolvable about an X axis. The caster turns on a Y axis and the X axis is spaced from the Y axis. Through the use of the caster-like arrangement, boats can be slipped into close quarters and the cradle can be turned to the left or right without substantially moving the rear end. Essentially, a boat can be shifted laterally with a back and forth motion and a turn to the left or right, without significantly moving it longitudinally. In that way, when the boat is placed in its location in the yard, minor adjustments in the location can be made without pulling the boat out from the location and resetting it through a series of in and out maneuvers.

In another aspect of the present invention, I have found that four rear wheels should be used, two of which are disposed on each side of the side members to form a set. The wheels should be each disposed independently and suspended on trunions that are rotatably attached to the side members. The trunions are connected together so that upon extension or the contraction of a cylinder disposed therebetween, the trunions of a set are counterrotatively pivoted about an axis formed where they attach to the side members. In that way, the cradle can be raised or lowered relative to the wheels to provide for the stable transportation disclosed above. Moreover, when both sets of the wheels are simultaneously raised or lowered, the frame can be lowered or raised to provide for easy movement when a boat is being moved in a yard or when a very large hole or hump is encountered. The boat is easily moved back or forth by means of the caster which is powered from the motor on the cradle.

BRIEF DESCRIPTION OF THE DRAWINGS

FIGS. 2A and 2B are side elevational views of the mobile cradle according to the present invention. In FIG. 2B, a boat is shown disposed upon elevated pads which hold it in place.

DESCRIPTION OF THE PREFERRED EMBODIMENTS

Figure 1:
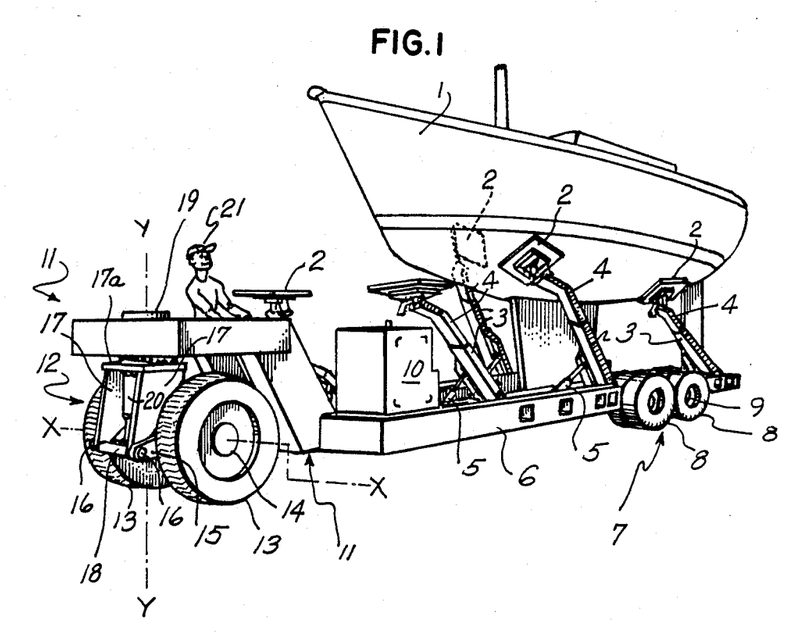
FIG. 1 is a perspective view of the boat cradle of the present invention.

Referring now to FIG. 1, a boat 1 is shown disposed upon pads 2 which are arranged at the distal ends of balancing arms 3. Extensions 4 are disposed inside of the sleeve formed by balancing arm 3 and are movable inwardly and outwardly by hydraulic means (not shown). Pads 2 are hingedly attached to extensions 4, as will be shown better in FIG. 5. Balancing arms 3 are raised and lowered through hydraulic cylinders 5 which are attached at one end to side members 6 and at the other end to balancing arms 3.

A rear wheel set 7 is disposed on the frame 6. The rear wheel 7 set comprises wheels 8 mounted on axles 9. A motor 10 is disposed near the forward end of the cradle and is used to generate power necessary to move the various components of the cradle through hydraulic lines (not shown). A goose neck support 11 is disposed at the forward end of the cradle. The goose neck 11 provides for the disposition of a caster assembly 12 which comprises wheels 13 mounted on hubs 14. Hubs 14 are the motive force for the cradle and are mounted on an X axis and are powered by hydraulic motive means (not shown except for the motor 10). Such motive means 10 drives the cradle back and forth by driving hubs 14 which in turn drive wheels 13. The X axis passes through an end of a trunions 15 which is rotative about a pivot point 16. The trunions 15 are disposed at the ends of a U-shaped yoke 17, the ends being rigidly held together by a bar 18. The base 17a of the yoke 17 is pivotally attached to the goose neck support 11 by means of a hydraulic turning assembly 19. A cylinder 20 is disposed between the base 17a of the yoke 17 and a bar (not shown) disposed between the trunions 15. Extension or contraction of the cylinder 20 causes the forward end of the cradle to move upwardly or downwardly, as required by the operator.

The operator 21 stands on a platform (not shown) disposed on the side of the cradle and controls the back and forth and lateral movement of the cradle, and the motions of the various hydraulic cylinders which are powered by a motor 10.

Figure 2A:
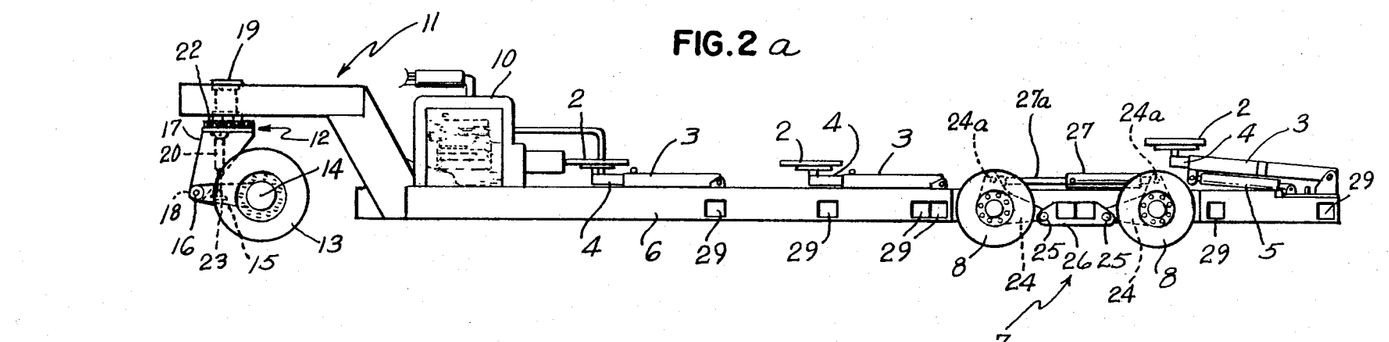
Figure 2B:
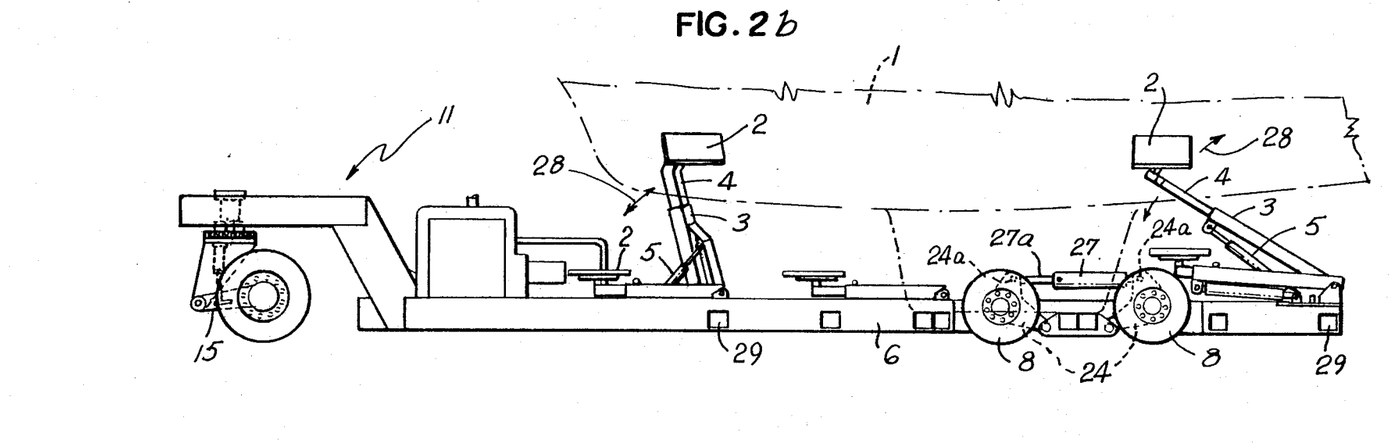

Referring now to FIGS. 2A and 2B, the goose neck support platform 11 is disposed at the forward end of the cradle. A hydraulically powered turning assembly 19 is supported on the horizontal portion of the goose neck assembly 11. A hydraulically powered motor (not shown) drives a sprocket wheel 22 to change the direction of the caster assembly 12. Extension or contraction of the cylinder 20 against a bar 23 causes the trunion 15 to raise or lower, thereby raising or lowering the goose neck platform 11.

The rear wheel set 7 are followers and includes a pair of trunions 24 that can rotate about bearings 25. Bearings 25 are disposed in a U-shaped bracket 26. The ends of trunions 24 are disposed within the U-shaped bracket 26 to provide support for the wheels 8. Wheels 8 are rotatably attached to trunions 24 to provide for the rear support of the cradle. Trunions 24 are connected together at points 24a by cylinder 27 which includes rod 27a. Upon the contraction of rod 27a in cylinder 27, trunions 24 counterrotate around bearings 25, whereby the rear end of frame 6 falls relative to the ground. When the rod 27a is extended from cylinder 27, the trunions 24 rotate in an opposite direction whereby the rear end of frame 6 will rise relative to the ground.

The result of the extension or contraction of the rod 27a in cylinder 27 is shown in FIG. 2B where the rod 27a is shown contracted within the cylinder 27. The rear end of the frame 6 is lower to the ground, and can even touch the ground when fully contracted.

As shown in FIG. 2B, the pads 2 are raised upwardly to engage the sides of the boat. The pads 2 swing in a direction as shown by the arrows 28 because of the pressurization of the cylinders 5 which are attached to balancing arms 3 and extensions 4.

Figure 3:
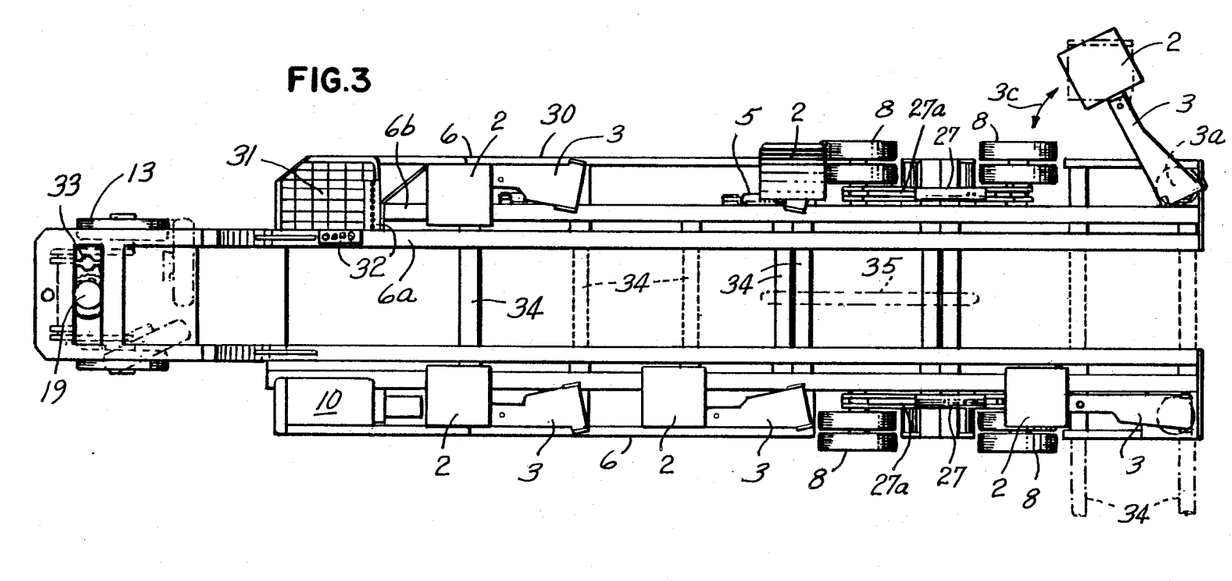
FIG. 3 is a top plan view of the mobile boat cradle according to the present invention.

In the embodiment shown in FIG. 3, one of the balancing arms (that is the one disposed in the center), is shown aligned with the side members 6, as they are preferably disposed when not engaging the boat and when they are not being used. Also, the pads and balancing arms at the forward and rear of the view in FIG. 2B are also shown similarly disposed. For ease of illustration, these pads are shown at rest, although their correlative pieces are shown as extended and engaging the boat 1.

An array of ports 29 are disposed in the frame and are aligned such that a through-hole extends within both of the side members 6 which constitute the cradle. Ports 29 are adapted to receive conventional slug beams (not shown) which can be used by the boat yard to span the two side members 6. When disposed within the side member 6, the slug beams will serve as a support for a narrow boat without a keel.

As shown in FIG. 3, the extension arms, in one embodiment, can be rotatably disposed upon the side members 6 at a point 3a to swing in an arc 3c. In the embodiment shown in FIG. 3, the side members 6 can be formed of rigid beams 6a and 6b with a rail 30 disposed on the outside thereof. The balancing arms 3 can be disposed between the side members 6b and the rail 30. In a preferred embodiment, the front balancing pad is angled at approximately 15° from the vertical to accommodate the stern of the boat.

An operator stand 31 with controls 32 is disposed at the forward end of the cradle. The controls are connected through hydraulic lines (not shown) to the various hydraulic cylinders and driving mechanisms used by the cradle. For example, the steering through wheels 13 is accomplished with hydraulic turning assembly 19 which is attached to a hydraulic motor 33 that is linked to sprocket 19 by a sprocket chain. Other controls 32 are linked to the other hydraulic cylinders in the cradle. As can be on the drawing, the wheels 13 turn (steer) around an axis which is spaced from the axis upon which the wheels 13 rotate. In this way, the caster-like arrangement is accomplished.

The slug beams 34 (mentioned previously) are disposed in ports 29 (not shown in this Figure) to support the keel of a boat. As shown in this drawing, the keel 35 can rest upon the slug beams as desired by the user to provide additional support for handling the boat.

Figure 4:
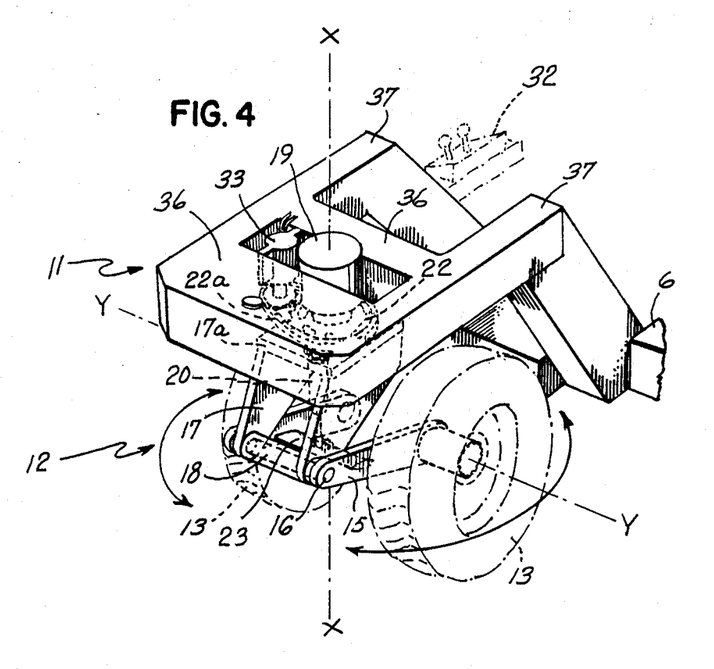
FIG. 4 is a fragmentary perspective view showing the caster-like construction of the forward wheel assembly.

Referring now to FIG. 4, a goose neck support 11 is shown that serves as a support for the caster assembly 12. The bearing housing which includes a hydraulic turning assembly 19 is disposed between a pair of transversely disposed supports 36. The hydraulic motor 33 is also disposed between the supports. Goose neck assembly 11 is formed of a pair of laterally spaced supports 37, which are attached to side members 6.

The yoke 17, as described previously, is formed in a generally U-shaped configuration with the base 17a of the U being attached to sprocket wheel 22. When the sprocket wheel 22 is turned by the hydraulic motor 33 that is linked to it by chain 22a, will turn about the X axis. The distal ends of the U-shaped yoke 17 are rotatably attached to trunions 15 by means of bar 18. The wheels 13 are attached to trunions 15 by means of an axle 13a.

As can be seen in the drawing, the wheels 13 revolve around an axis Y—Y, and yoke 17 revolves around an axis X—X. Axis Y—Y is disposed behind axis X—X, thus producing the caster effect that is described herein.

Figure 5:
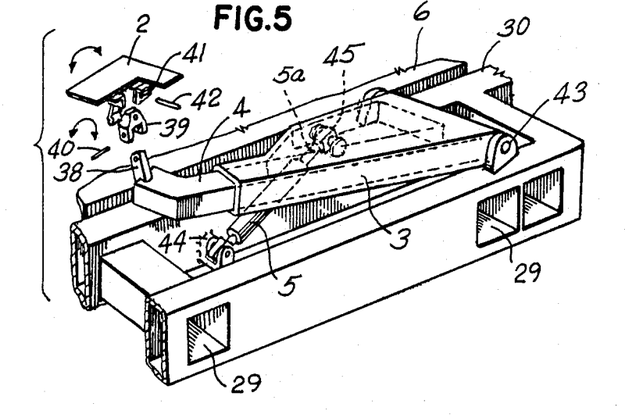
FIG. 5 is a fragmentary, exploded perspective view of a balancing arm and pad which can be used to hold the boat according to the present invention.

Referring to FIG. 5, the balancing arms construction is shown. The balancing arm includes the pad 2 that is hingedly attached to the extension 4. Extension 4 has a knuckle assembly which includes a male member 38 that fits into a linking member 39. Linking member 39 is held in place, relative to male member 38, by a pin 40. Linking member 39 is also hingedly attached to female member 41 by a pin 42. The female member 41 is welded to the bottom of pad 2, and through the assembly described, the pad 2 can move in all directions that it normally will encounter when a boat is rested upon it.

Extension 4 is slidably disposed within balancing arm 3 which has a cylinder and piston arranged therein (not shown) to automatically raise or lower pad 2. Balancing arm 3 is pivotably attached to rail 30 which includes a related support structure 30a. The balancing arm 3 swings around pivot point 43 and is actuated by hydraulic cylinder 5. In a preferred embodiment, hydraulic cylinder 5 is mounted between tang 44 and receiving pivot point 45. Upon extension of the rod 5a, the balancing arm 3 will be elevated to a predetermined point. Extension of the rod 5a is accomplished by means of hydraulic linkages (not shown).

Figure 6:
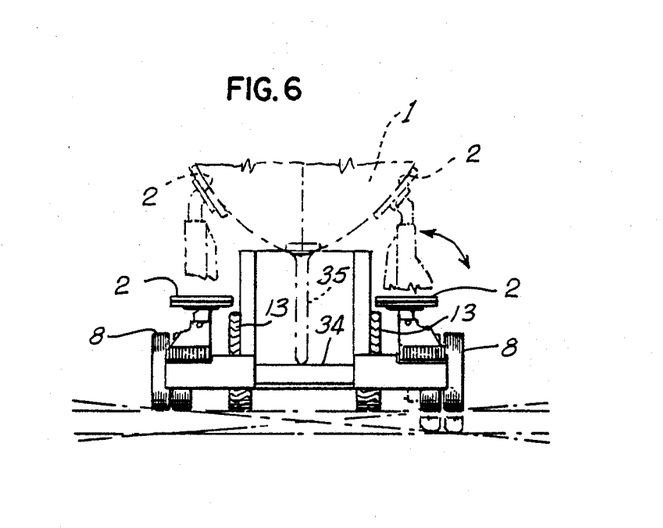
FIG. 6 is a rear elevational view of the mobile boat cradle showing the disposition of a boat on the balancing arms.

Referring to FIG. 6, it can be seen how pads 2 engage the sides of the boat 1. The keel 35 engages the slug beams 34, the combination of which holds the boat in place. The goose neck assembly support 11 is disposed forwardly of the heel 35. As can be seen, the spacing between the front wheels 13 and the rear wheels 8 is significantly less. In the preferred embodiment, the width of the front wheels 13 is less than about 50% of the width of the rear wheels 8. In this way, through the use of the caster-like assembly, the forward end of the cradle can be moved in a longitudinal direction while the front end of the cradle can be moved laterally. The shifting of the caster assembly to the left or right will enable the operator to utilize a smaller amount of space in the boat yard for the storage of a large number of boats.

Figure 7:
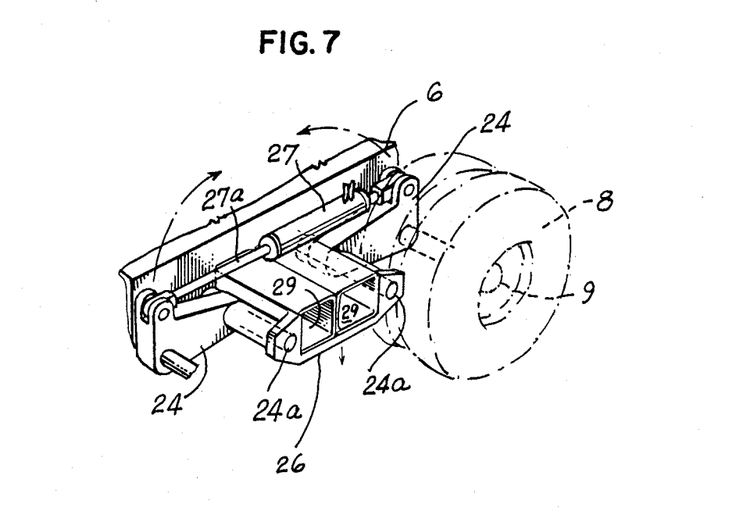
FIG. 7 is a fragmentary perspective view of the rear wheel assembly which is used to lower or raise the frame relative to the ground.

Referring now to FIG. 7, the view shows the wheels 8 associated with the side members 6 (only one wheel 8 is shown for ease of illustration, but there are two, independently suspended). The axle 9 of wheel 8 is rotatably disposed on trunion 24 that is pivotably arranged on bearing points 24a. Bearing points 24a can be disposed within a U-shaped bracket 26. Ports 29 can be disposed within the yoke 26 to provide for the slug beams 34.

Upon extension of rod 27a from cylinder 27, forward trunion 24 will rotate counterclockwise and rear trunion 24 will rotate clockwise. When the two trunions rotate in those directions, the side members 6 will elevate relative to the ground upon which wheels 8 rest. When rod 27a is retracted into cylinder 27, the forward trunion 24 will rotate in a clockwise direction about pivot point 24a and rear trunion 24 will rotate in a counterclockwise direction around the other pivot point 24a. In the latter case, side member 6 will raise relative to the ground upon which tires 8 rest. The construction of the hydraulic arrangement in the cradle of the present invention is such that the left side or the right side of the rear end of the cradle can be lifted independently, whereby a boat can be transported easily over rough terrain. Through this arrangement, boats are less likely to tip over during transport. Moreover, through the arrangement, the operator of the cradle can more easily juggle boats into small spaces in a boat yard and by raising or lowering the boats with the adjustable height devices, and can place more boats in a boat yard.

It is apparent that changes and modifications can be made within the spirit and scope of the present invention. It is my intention, however, only to be limited by the scope of the appended claims.

As my invention, I claim:

1. A self-propelled mobile cradle for boats, said cradle comprising:

a frame having transversely spaced, longitudinally extending side members interconnected at their forward ends to form an opening extending inwardly from the rear end of the frame;

forward wheel means for supporting the forward end of said frame;

rear wheel means disposed at the rear of the frame for supporting the rear of the frame, said rear wheel means comprising at least two wheels, each independently operable from the other to raise or lower a respective side of said frame, at least one of said wheels being disposed on each side of said frame;

rear motive means for raising or lowering said frame relative to said independently operable rear wheel means, said rear motive means comprising an independently operable suspension for each of said rear wheel means, whereby one side of said frame can be raised or lowered relative to the other side of said frame;

forward motive means for raising or lowering the forward end of said frame relative to said forward wheel means, said forward motive means including a generally U-shaped yoke supporting said forward wheel means and a trunion pivotably attached to each end of the U of said yoke, said forward wheel means being rotatably disposed on said trunions;

steering means for turning said forward wheel means about an axis generally normal to said longitudinally extending side members, whereby said cradle can be turned by turning said forward wheel means;

means for driving said mobile cradle and power means for each of said forward and said rear motive means;

engaging means attached to and disposed on each side of said longitudinally extending side members to engage the bottom of a boat and hold it stationary relative to said cradle.

2. The mobile cradle according to claim 1 further including a goose-necked platform means disposed at the forward end of said frame, said platform means being attached to said longitudinally extending side members and elevated therefrom, said forward driven wheel means being disposed beneath said platform means.

3. The mobile cradle according to claim 1 wherein said forward wheel means comprises two closely spaced wheels, said wheels operating in unison to move the forward end of said cradle upwardly or downwardly.

4. The mobile cradle according to claim 1 wherein said engaging means includes at least four balancing arms, two of which are disposed upon each of said side members, the two balancing arms nearest the forward end of the cradle being pivotable on an axis substantially normal to said side members, and the balancing arms nearer the end of said cradle being pivotable on an axis at an angle to said side members.

5. The mobile boat cradle according to claim 1 wherein the rear wheels are spaced from each other by a predetermined distance, the spacing of the rear wheels from each other on each side of the frame being greater then the distance between outside opposite sides of the forward wheel means, whereby to form a three point disposition for said cradle between said forward wheel means and said rear wheels.

6. The mobile boat cradle according to claim 5 wherein said forward wheel means is driven and comprises two forward wheels, spaced from each other by a predetermined distance.

7. The mobile boat cradle according to claim 6 wherein the spacing between opposite sides of the forward driven wheel means is less then half the spacing of the rear wheels.

8. The mobile boat cradle according to claim 1 wherein said rear wheel means comprises four wheels, two of which are disposed on each side of said side members to form a set, said wheels each being disposed on independently suspended trunions that are rotatably attached to said side members.

9. The mobile boat cradle according to claim 8 wherein said rear motive means are extendable means connecting the trunions of each side together whereby upon extension or contraction of said extendable means, the trunions of a set are counterrotatively pivoted around axes formed at the points of attachment of said trunions to said side members, whereby to raise or lower one side or the other of said cradle.

10. The mobile cradle according to claim 1 wherein said steering means is revolvable about a Y-axis, said Y-axis being generally normal to said X-axis and being spaced from said X-axis, whereby the cradle is supported at the forward end by a caster.

11. The mobile cradle according to claim 10 wherein the forward wheels are driven.

12. The mobile boat cradle according to claim 1 wherein the forward wheel means is driven.

13. A self-propelled mobile cradle for boats, said cradle comprising:

a frame having transversely spaced, longitudinally extending side members interconnected at their forward ends to form an opening extending inwardly from the rear end of the frame;

caster means for supporting the forward end of said frame, said caster means including a generally U-shaped yoke, a trunion pivotably attached to each end of the U of said U-shaped yoke and forward wheel means rotatably disposed on each of said trunions, said forward wheel means being revolvable about an X-axis;

steering means for turning said caster means about a Y-axis, said Y-axis being generally normal to said X-axis and being spaced from said X-axis;

a front beam disposed between said trunions, and an extendable cylinder disposed between said front beam and said yoke whereby to raise or lower the forward end of said frame;

rear wheel means disposed at the rear of the frame for supporting the rear of the frame, said rear wheel means comprising at least one rear wheel disposed on each side of said frame, each of said rear wheels being independently operable from the other to raise or lower a respective side of said frame;

rear motive means for raising or lowering said frame relative to said rear wheels, said rear motive means comprising an independently operable suspension for each of said rear wheel means;

means for driving said forward wheel means and means for powering said forward and said rear motive means;

engaging means attached to and disposed on each side of said longitudinally extending side members to engage the bottom of a boat and hold it stationary relative to said cradle.

14. The mobile boat cradle according to claim 13 wherein said rear wheel means comprises at least four wheels, at least two of which are disposed on each side of said side members to form a set, said wheels each being disposed on independently suspended trunions that are rotatably attached to said side members.

15. The mobile boat cradle according to claim 14 wherein said rear motive means are extendable means connecting the trunions of each side together whereby upon extension or contraction of said extendable means, the trunions of a set are counterrotatively pivoted around axes formed at the points of attachment of said trunions to said side members, whereby to independently raise or lower one side or the other of said cradle.

16. A self-propelled mobile cradle for boats, said cradle comprising:

a frame having transversely spaced, longitudinally extending side members interconnected at their forward ends to form an opening extending inwardly from the rear end of the frame;

forward wheel means for supporting the forward end of said frame;

rear wheel means disposed at the rear of the frame, said rear wheel means comprising a set of at least two wheels on each side of said frame and a trunion supporting each wheel, the trunions of each set being rotatable in opposite directions from a central support and connected by a rear motive means for raising or lowering said frame relative to said rear wheel means, each set being independently operable from the other whereby a respective side of said frame can be raised or lowered relative to the other side of said frame;

forward motive means for raising or lowering the forward end of said frame relative to said forward wheel means, said forward motive means including a U-shaped yoke and a trunion pivotably attached to each end of the U of said U-shaped yoke, said forward wheel means being rotatably disposed on each of said trunions;

means for driving said mobile cradle and power means for each of said forward and said rear motive means;

engaging means attached to and disposed on each side of said longitudinally extending side members to engage the bottom of a boat and hold it stationary relative to said cradle.

* * * * *